United States Patent

[11] 3,570,783

| [72] | Inventors | Friedrich Winkler<br>Unterhaching;<br>Kurt Thate, Munich, Germany |
|---|---|---|
| [21] | Appl. No. | 808,385 |
| [22] | Filed | Mar. 17, 1969 |
| [45] | Patented | Mar. 16, 1971 |
| [73] | Assignee | AGFA-Gevaert Aktiengesellschaft<br>Leverkusen, Germany |
| [32] | Priority | Mar. 28, 1968 |
| [33] | | Germany |
| [31] | | P 17 72 083.1 |

[54] MOTION PICTURE CAMERA
14 Claims, 1 Drawing Fig.

[52] U.S. Cl. ..................................... 242/205,
74/88, 74/143
[51] Int. Cl. ....................................... B11b 15/32,
G03b 1/04
[50] Field of Search .......................................... 242/205-
—207; 74/33, 88, 143; 352/186—190

[56] References Cited
UNITED STATES PATENTS

| 1,351,938 | 9/1920 | Allen | 74/143 |
| 2,135,026 | 11/1938 | Becker | 242/205 |

*Primary Examiner*—Leonard D. Christian
*Attorney*—Michael S. Striker

ABSTRACT: The takeup reel of a motion picture camera is rotated by way of the claw pulldown. The connection between the pulldown and the reel comprises a pair of meshing gears one of which is connected with the reel, a two-armed lever one arm of which is rocked by the pulldown by way of a torsion spring and the other arm of which carries two pawls. One pawl is disengaged from one of the gears when the other pawl rotates the other gear, and vice versa, whereby the reel rotates in a single direction.

PATENTED MAR 16 1971
3,570,783
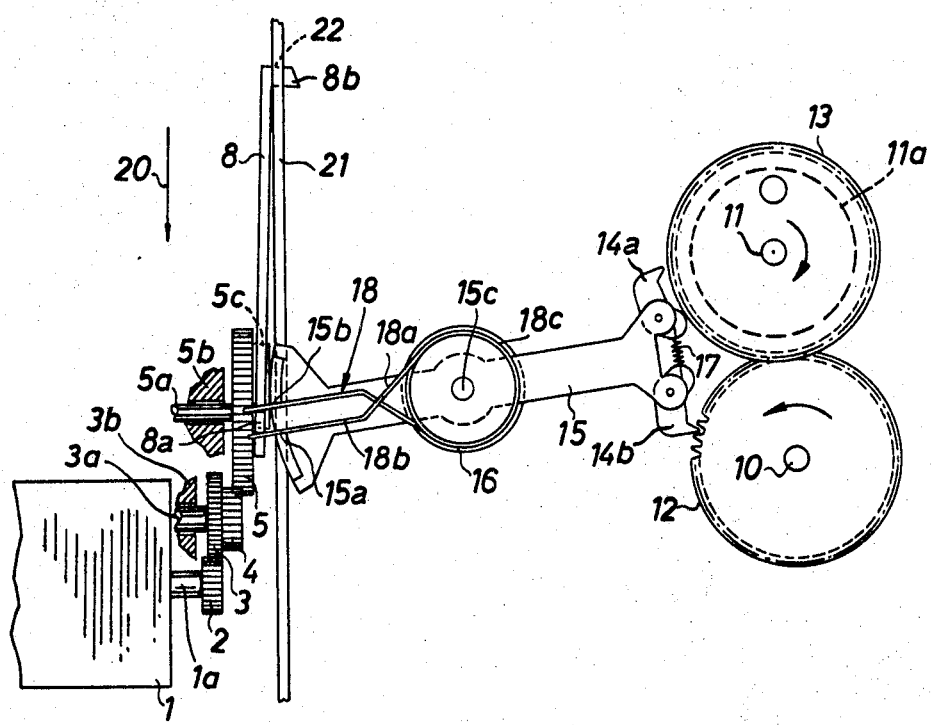
INVENTOR.
FRIEDRICH WINKLER
KURT THATE
BY
Michael S. Striker
A Horne 8 3,570,783

MOTION PICTURE CAMERA

BACKGROUND OF THE INVENTION

The present invention relates to photographic apparatus in general and more particularly to improvements in motion picture cameras, especially in 8-millimeter motion picture cameras. Still more particularly, the invention relates to improvements in film transporting mechanisms for motion picture cameras.

In a motion picture camera, a motor normally drives a claw pulldown which transports film stepwise past the film gate. The motor also drives the takeup reel which collects the film at a point remote from the claw pulldown. As a rule, the takeup reel receives a rotary motion by way of a worm and worm wheel. A drawback of such film transporting mechanisms is that the efficiency of worm drives is very low and that their manufacturing cost is high. Furthermore, the operative connection between the worm drive and the takeup reel must include a friction coupling which permits the takeup reel to remain at a standstill while the motor continues to operate the worm drive when the entire film is collected by the takeup reel. This insures that the film does not tear or that its trailing end is not disconnected from the supply reel. The friction coupling must be constructed and mounted with a high degree of accuracy to insure that it produces a constant friction. This is normally achieved by employing a friction coupling with several axially aligned elements which are in frictional engagement with each other. Such assembly of the coupling insures that at least one pair of frictionally engaged elements offers a predetermined resistance to movement of one element with reference to the other element even if the coupling undergoes considerable wear. Alternatively, the coupling comprises one or more adjustable springs which must be adjusted from time to time by qualified workmen to compensate for wear.

SUMMARY OF THE INVENTION

An object of out invention is to provide a film transporting mechanism wherein the power train between the motor and the takeup reel need not include a worm drive and/or a friction coupling.

Another object of the invention is to provide a motion transmitting mechanism which can be operated by exertion of a smaller force than presently known mechanisms.

A further object of the invention is to provide a film transporting mechanism which is more compact, simpler and less expensive than the mechanisms of presently known motion picture cameras.

An additional object of the invention is to provide a film transporting mechanism which can be installed in presently known types of motion picture cameras.

The improved film transporting mechanism comprises a first gear which is drivingly connected with a film collecting member, preferably a takeup reel, and meshes with a second gear, and means for alternatingly rotating the gears in opposite directions so that the film collecting member is driven in a single direction, either directly by the first gear or by the second gear through the intermediary of the first gear. The means for rotating the gears in opposite directions preferably comprises a pair of pawls and means for moving one of the pawls into rotary motion transmitting engagement with one of the gears when the other pawl is disengaged from the other gear, and vice versa. The means for moving the pawls preferably comprises a two-armed lever one arm of which carries the pawls and the other arm of which receives rocking motion from the output shaft of the motor, for example, by way of the customary claw pulldown and by interposition of a resilient element.

The novel features which are considered as characteristic of the invention are set forth in particular in the appended claims. The improved film transporting mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIG. is a schematic and elevational view of a film transporting mechanism which is installed in a motion picture camera and embodies our invention.

DESCRIPTION OF THE PREFERRED EMBODIMENTS

The drawing shows a portion of an electric motor 1 which is installed in the housing or body of a motion picture camera, preferably an 8-millimeter camera. The output shaft 1a of the motor carries a gear 2 in mesh with a gear 3 mounted on an intermediate shaft 3a which is journaled in a wall 3b forming part of the camera body. The shaft 3a carries a second gear 4 which is coaxial with the gear 3 and drives a larger gear 5 mounted on a shaft 5a which is journaled in a wall 5b. The gear 5 rotates an eccentric driving member 5c which reciprocates a claw pulldown 8. The latter has a claw 8b which can enter the perforations 22 of a film 21 to move the film stepwise past the film gate, not shown. It will be seen that the gear train 2, 3, 4 5 and the eccentric 5c from part of a first power train which reciprocates the pulldown 8. A second power train which derives motion from the first power train or from the pulldown 8 is employed to rotate the shaft 11 of a film collecting or takeup reel 11a and the shutter (not shown). This second power train includes the following:

The shaft 11 of the takeup reel 11a is connected with a first gear 13 which meshes with a second gear 12 on a shaft 10. The diameters of the gears 12, 13 are the same. The shaft 11 should rotate in a clockwise direction in order to convolute the film 21 onto the takeup reel 11a. This is achieved by rotating the gear 13 in a clockwise direction by way of a first pawl 14a or by rotating the gear 12 in a counterclockwise direction by way of a second pawl 14b. The pawls 14a, 14b are pivotably mounted on the right-hand arm of a two-armed lever 15 which is mounted on a pivot pin 15c and receives motion from the claw pulldown 8 by way of a torsion spring 18. It will be see that the parts 15, 14a, 14b, 18 constitute a device for converting reciprocatory movements of the pulldown 8 into intermittent rotary movements of the shaft 11. The pawls 14a, 14b are coupled to each other by a helical spring 17 which tends to hold them in the illustrated positions. The pivot member 15c is mounted in the housing of the camera and the lever 15 has a large central portion or hub 16 which supports the convoluted part 18c of the torsion spring 18. The left-hand arm of the lever 15 is provided with two stops 15a, 15b, for the legs 18a, 18b of the torsion spring 18. The tips of the legs 18a, 18b straddle a motion transmitting projection or lug 8a of the claw pulldown 8.

The operation:

The drawing shows the pulldown 8 in a position in which its claw 8b still extends into a perforation 22 of the film 21. The eccentric 5c has completed movement of the pulldown 8 in the direction indicated by arrow 20. During such the pulldown of the pulldown 8, the legs 18a, 18b caused the lever 15 to turn in a counterclockwise direction whereby the pawl 14a caused the gear 13 to rotate the shaft 11 and takeup reel 11a in a clockwise direction. When the pulldown reaches the lower end of its stroke, as viewed in the drawing, its claw 8b is caused to leave the perforation 22 and the eccentric 5c then moves the pulldown 8 upwardly, i.e., counter to the direction indicated by arrow 20. This causes the projection 8a and the legs 18a, 18b to pivot the lever 15 in a clockwise direction whereby the pawl 14b rotates the gear 12 in a counterclockwise direction. Since the gear 12 meshes the gear 13, the shaft 11 and takeup reel 11a are caused to rotate in a clockwise direction, namely, in the same direction as when the pawl 14a drives the gear 13. The pawl 14a is disengaged from the teeth of the gear 13 when the pulldown 8 reaches its lower end position and the pawl 14b is disengaged from the gear 12 when the pulldown reaches its upper end position. The pawl 14a engages with the teeth of gear 13 when the pawl 14b is disengaged from the teeth of gear 12, and vice versa. The takeup reel 11a is always rotated in the clockwise direction, regardless of whether the pulldown 8 moves up or down, as viewed in the drawing.

An important advantage of our film transporting mechanism is that the camera which embodies such mechanism need not employ a worm drive which is standard part of many presently known motion picture cameras. Also, the improved film transporting mechanism can dispense with many additional parts which are needed in the driving connection between the motor and the takeup reel of a conventional camera. The efficiency of a worm wheel drive (as regards the transmission of forces) is very unsatisfactory, and the cost of a power train which employs a worm drive and one or more additional gears is much higher than the cost of the power train which includes the parts 15, 18, 14a, 14b and 12, 13. Another important advantage of the improved film transporting mechanism is that it need not employ a friction coupling between the shaft 11 and the takeup reel 11a or between the shaft 11 and gear 13. Such friction couplings are absolutely necessary in nearly all types of presently known film transporting mechanisms. We omit the friction coupling if the convoluted part 18c of the spring 18 simply slips on the hub 16 of the lever 15 when the film 21 is fully collected by the takeup reel 11a. At the present time, we prefer to design the legs 18a, 18b of the spring 18 in such a way that they yield sufficiently when the film is collected by the reel 11a. The legs 18a, 18b then continue to move with the projection 8a but the lever 15 remains at a standstill.

It is clear that the improved film transporting mechanism is susceptible of many modifications without departing from the spirit of our invention. For example, the reel 11a can be mounted on the shaft 10 of the gear 12. . Also, the spring 18 need not be moved by the projection 8a of the pulldown 8 because the mechanism can include a second eccentric which is driven by the output shaft 1a or by one of the shafts 3a, 5a and reciprocates a member which performs reciprocatory movements similar to those of the pulldown 8. Such reciprocable member then transmits motion to the lever 15 by way of the spring 18 or by way of an analogous resilient motion transmitting element.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

We claim:

1. In a film transporting mechanism for motion picture cameras, a combination comprising a rotary film collecting member; a first gear drivingly connected with said film collecting member; a second gear meshing with said first gear; and means for alternatingly rotating said gears in opposite directions so that said film collecting member is driven in a single direction, comprising a pair of pawls and means for moving one of said pawls into a motion transmitting engagement with one of said gears when the other pawl is disengaged from the other gear, and vice versa, said means for moving said pawls comprising a lever which is rockable about a fixed axis and comprises an arm pivotably supporting said pawls, means for rocking said lever, and resilient means yieldably coupling said pawls to each other.

2. In a film transporting mechanism for motion picture cameras, a combination comprising a rotary film collecting member,; a first gear drivingly connected with said film collecting member; a second gear meshing with said first gear; and means for alternatingly rotating said gears in opposite directions so that said film collecting member is driven in a single direction, comprising a pair of pawls and means for moving one of said pawls into rotary motion transmitting engagement with one of said gears when the other pawl is disengaged from the other gear, and vice versa, said means for moving said pawls comprising a lever which is rockable about a fixed axis and comprises an arm supporting said pawls, and a reciprocable claw pulldown for rocking said lever.

3. A combination as defined in claim 2, wherein the means for rocking said lever further comprises motion transmitting means yieldably connecting said lever to said claw pulldown.

4. A combination as defined in claim 3, wherein said motion transmitting means comprises resilient means arranged to yield in response to reciprocation of said claw pulldown when said lever encounters a predetermined resistance to rocking movement about said axis.

5. A combination as defined in claim 4, wherein said resilient means comprises a torsion spring.

6. A combination as defined in claim 5, wherein said lever comprises a second arm and wherein said torsion spring comprises a coiled portion surrounding said axis and two elongated legs, said second arm of the lever being provided with stop means for said legs and said pulldown comprising a motion transmitting projection which is flanked by said legs.

7. In a film transporting mechanism for motion picture cameras, a combination comprising a rotary film collecting member; a first gear drivingly connected with said film collecting member; a second gear meshing with said first gear; and means for alternatingly rotating said gears in opposite directions so that said film collecting member is driven in a single direction, comprising a pair of pawls and means for moving one of said pawls into rotary motion transmitting engagement with one of said gears when the other pawl is disengaged from the other gear, and vice versa, said means for moving said pawls comprising a lever which is rockable about a fixed axis and comprises an arm supporting said pawls, and an eccentric for rocking said lever.

8. A combination as defined in claim 7, wherein the means for rocking said lever further comprises a member which is reciprocated by said eccentric and transmits rocking motion to said lever.

9. A combination as defined in claim 7, wherein said first gear comprises a shaft and wherein said film collecting member is a takeup reel which is driven by said shaft.

10. In a film transporting mechanism for motion picture cameras, a combination comprising a rotary film collecting member; a first gear drivingly connected with said film collecting member; a second gear meshing with said first gear; a claw pulldown arranged to transport stepwise a portion of film which is remote from said collecting member; a motor having a rotary output member; a first power train connecting said pulldown with said output member and arranged to reciprocate said pulldown; and means for alternatingly rotating said gears in opposite directions so that said film collecting member is driven in a single direction, comprising a second power train which receives motion from said output member.

11. A combination as defined in claim 10 wherein said second power train derives motion from said output member by way of said claw pulldown.

12. A combination as defined in claim 10, wherein said second power train derives motion from said output member by way of said first-mentioned power train.

13. In a film transporting mechanism for motion picture cameras, a combination comprising a rotary film collecting member; a first rotary driven element drivingly connected with said film collecting member; a second rotary driven element cooperating with said first driven element to rotate in a second direction when said first driven element is rotated in a first direction and to drive said first element in said first direction when driven to rotate in said second direction; and means for alternatingly driving said first and second driven elements in said first and second directions, respectively, so that the film collecting member is rotated in a single direction, comprising a pair of driving elements and means for moving one of said driving elements into driving engagement with said first driven element when the other driving element is disengaged from the other driven element, and vice versa, said means for moving said driving elements comprising a carrier which is workable about a predetermined axis and supports said driving elements, and a claw pulldown for rocking said carrier.

14. In a film transporting mechanism for motion picture cameras, a combination comprising a rotary film collecting member; a first rotary driven element drivingly connected with said film collecting member; a second rotary driven element cooperating with said first driven element to rotate in a second direction when said first element is driven to rotate in a first direction, and to rotate said first element in said first direction when driven to rotate in said second direction; and means for alternatingly driving said first and second driven elements in said first and second directions, respectively, so that the film collecting member is rotated in a single direction, comprising a pair of driving elements and means for moving one of said driving elements into driving engagement with one of said driven elements to rotate said one driven element in the respective direction when the other driving element is disengaged from the other driving element, and vice versa, said means for moving said driving element comprising a carrier which is rockable about a predetermined axis and supports said driving members, and eccentric means for rocking said carrier.